United States Patent [19]
Poston

[11] Patent Number: 6,061,447
[45] Date of Patent: May 9, 2000

[54] PROTECTION DEVICE FOR TELEPHONE LINE AND INTERFACE

[75] Inventor: Travis Poston, Humacao, Puerto Rico

[73] Assignee: N&T Systems of Puerto Rico, Inc., Humacao, Puerto Rico

[21] Appl. No.: 09/007,806

[22] Filed: Jan. 15, 1998

Related U.S. Application Data

[63] Continuation-in-part of application No. 08/387,166, Feb. 13, 1995, Pat. No. 5,930,355.

[51] Int. Cl.[7] .................................................. H04M 1/00
[52] U.S. Cl. ............................................ 379/451; 379/437
[58] Field of Search ................................. 379/451, 436, 379/437, 438, 399, 145; 340/550, 568; 109/38, 41, 42; 174/38; 361/643, 644

[56] References Cited

U.S. PATENT DOCUMENTS

| | | | |
|---|---|---|---|
| 2,879,725 | 3/1959 | Zuver | 109/42 |
| 3,633,194 | 1/1972 | Kothe | 340/550 |
| 4,246,451 | 1/1981 | Nix | 379/451 |
| 4,673,771 | 6/1987 | Grant | 174/38 |
| 4,731,819 | 3/1988 | Kalfon | 379/145 |
| 5,018,185 | 5/1991 | Riddle | 379/145 |
| 5,315,654 | 5/1994 | Kraft | 379/436 |
| 5,369,548 | 11/1994 | Combs | 361/643 |
| 5,930,355 | 7/1999 | Poston | 379/451 |

*Primary Examiner*—Jack Chiang
*Attorney, Agent, or Firm*—McDermott, Will & Emery

[57] ABSTRACT

A passive, non-armored shield for protecting e.g., an exterior telephone service line and/or telephone service box. The shield comprises a layered structure which includes a TP non-conductive, preferably styrene panel which is sized and dimensioned to encase a space which includes the telephone service line and telephone service box. A pair of conductive laminates, each having a conductive foil layer (e.g., aluminum) and a non-conductive layer, e.g., polyester film and a heat seal coating are disposed on the panel. Each of the conductive layers is electrically connected to an electrical contact pad which in turn is connected via a terminal block to a building alarm and/or security system. Tamper switches are also provided to detect any unauthorized attempt to remove the shield. Any attempt by an intruder to cut the telephone service lines or disconnect the telephone service box will trigger an alarm via the tamper switch and/or a short circuit created between the conductive layers by, for example, use of a drill, saw, knife, or the like, to penetrate the shield.

18 Claims, 7 Drawing Sheets

PROTECTION DEVICE FOR TELEPHONE LINE AND INTERFACE

This application is a continuation-in-part of application Ser. No. 08/387,166 filed Feb. 13, 1995, U.S. Pat. No. 5,930,355.

BACKGROUND

1. Field of the Invention

The present invention relates to a security device which operates on detection principles—as opposed to armored resistance to PENETRATION—and more particularly to an electrical shield for the protection e.g., of telephone service lines going into and out of a building and/or an associated exterior telephone service or interconnection box.

2. Background of the Invention

Many security systems for homes and commercial buildings use telephone lines to automatically alert police and/or private security forces of attempted intrusions or disturbances. Security for such lines is crucial if the security system is to function as intended. Typically, the telephone lines within a building are connected to the telephone company service lines through an exterior-mounted service or interconnection box. Such telephone service lines and interconnection boxes are subject to tampering, severing, or destruction by intruders or burglars who know to disable the telephone system in order to defeat the building security system.

In general, various devices have been proposed for protection of telephones and telephone lines from vandalism or intrusion. For example, Nix, in U.S. Pat. No. 4,246,451, provides a secure mounting and latching system for a coin telephone mounted on a post in which the telephone and coin box are received in a hardened (i.e., armored) recess closely dimensioned to the size of the telephone housing to frustrate any attempt to pry the telephone and coin box out of the support structure.

Grant, in U.S. Pat. No. 4,673,771, provides a modular, weather-proof terminal box housing designed to be positioned adjacent a large commercial building, the box being partly buried and having a removable panel to provide easy access for changing cables or telephone connections on an interconnection box at the exterior of the building.

Kalfon, in U.S. Pat. No. 4,731,819, describes a device for securing a coin box, such as those associated with pay telephones, to a post anchored to the ground. The installation presents a smooth surface having only a single access to the coin box in order to make the installation vandal-resistant.

Riddle, in U.S. Pat. No. 5,018,185, provides a tamper-resistant pay telephone which uses encasing armor, especially around the cord connecting the handset to the telephone, to make the telephone more vandal-resistant.

Further, some devices have been proposed for protecting exterior telephone lines and interconnection panels. For example, Kraft, in U.S. Pat. No. 5,315,654, and Combs, in U.S. Pat. No. 5,369,548, propose protection devices based upon an armor concept, i.e., in which the physical strength of the protection body is the main deterrent to intrusion. Such protective devices, in addition to being expensive to manufacture and typically requiring professional installation, have proven vulnerable to attack by intruders using high-powered (typically battery-operated) drills or other powered cutting tools.

What is needed is an inexpensive, easy-to-install, protection device which, instead of relying on armor principles to resist penetration presents a "smart" electrical barrier or shield which does not rely on the armor-type protection, but which will respond to an attack on it as if it were an intrusion attempt on the building, and which will automatically signal an alert to police and/or private security forces, for example, by using a preexisting building security system.

SUMMARY OF THE INVENTION

It is an object of the present invention to provide a security device in the form of a shield. It is a further object of the invention to provide a security shield to protect, e.g., exterior telephone lines and/or telephone line interconnection boxes.

It is a further object of the invention to provide a generally weather-resistant, non-armored physical barrier for e.g., exterior telephone service lines and/or telephone interconnection boxes, which will generate an alarm signal upon an attempt to disable the service lines or interconnection boxes.

It is still a further object of the present invention to provide an electronic shield which surrounds e.g., an exterior telephone line and/or interconnection box, and which signals an alarm upon an unauthorized attempt to access same.

It is yet a further object of the invention to provide a reliable and effective protective device which is inexpensive to manufacture and easy to install, and which preferably takes advantage of preexisting security systems.

It is yet a further object of the invention to provide a method for protecting e.g., telephone service lines or interconnection boxes, against tampering.

Additional objects, advantages and novel features of the invention will be set forth in part in the description which follows, and in part will become apparent to those skilled in the art upon examination of the specification or by practice of the invention. The objects and advantages of the invention may be realized and attained by means of instrumentality's and combinations particularly pointed out in the appended claims.

To achieve the foregoing and other objects, and in accordance with the purpose of the present invention, as embodied and broadly described herein, the shield apparatus according to this invention may comprise a passive electrical shield for securing an enclosed device, the shield comprising a pair of generally complimentary shaped non-conductive, non-armored panels sized and configured to essentially fully enclose the device to be protected, the panels being in the form of an enclosure having an opening at a front side which is adapted to be attached against a wall of a building on which the device is mounted.

A terminal block for connecting the conductive layers to an alarm is electrically connected to the conductive layers of the laminate.

The electrical shield is secured to the wall so that the device to be protected is essentially fully encased. If the conductive layers are short circuited, i.e., in the event of an intrusion attempt, an electrical circuit is completed and the alarm is triggered.

Preferably, at least one tamper switch, responsive to displacement of the shield with respect to the wall, may be included to trigger said alarm; the tamper switch having an associated trigger bar mounted on said wall for causing the tamper switch to generate an electrical signal if the shield is moved. The tamper switch preferably includes a spring based arm adapted to engage the trigger bar when shield is mounted on the wall.

More preferably, a pair of tamper switches, responsive to movement of the shield may be used, the switches being disposed along opposite sides of the shield and vertically staggered with respect to the orientation of the shield when mounted.

Preferably, the alarm is part of an alarm system of the building and the terminal block and the tamper switch are connected to the alarm system.

Preferably, the conductive laminate comprises a pair of conductive foil laminates, laminated together, each of the laminates including a conductive foil layer and a non-conductive layer; the conductive foils comprises a thin layer of aluminum, and the non-conductive layers comprising a polyester film and heat seal coating.

Preferably, the terminal comprises a PCB having a terminal block supported thereon, the PCB having a pair of conductive pads, each electrically connected to one of said aluminum foil layers; the terminal block having a pair of terminals, each electrically connected to one of the pads so that an electrical short circuit between the aluminum foil layers will activate the alarm.

BRIEF DESCRIPTION OF THE DRAWINGS

The accompanying drawings, which are incorporated in and form a part of the specification, illustrate a presently preferred exemplary embodiment of the present invention and, together with the description, serve to explain the principles of the invention. In the drawings.

DETAILED DESCRIPTION OF THE INVENTION

Reference will now be made in detail to a presently preferred embodiment of the invention, an example of which is illustrated in the accompanying drawings.

Figure 1:
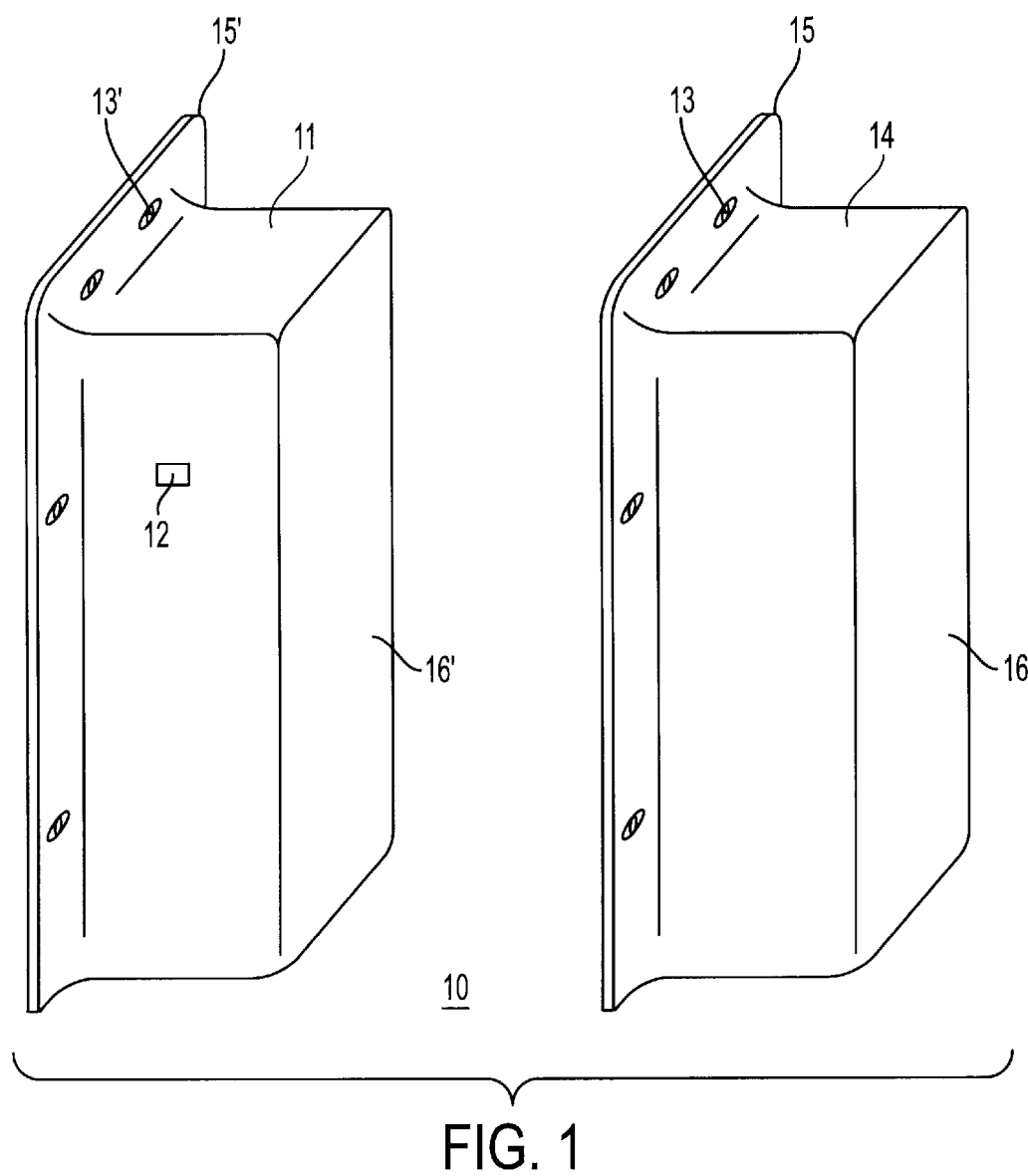
FIG. 1 is an exploded perspective view of a two part shield according to the present invention, showing exempla inner and outer panels which form the shield.

Referring first to FIG. 1, there is depicted an exploded perspective view-of the two part shield according to the present convention. As explained below, the shield 10 need only provide a generally structurally Self supporting shape, it need not, and preferably does not function as a protective armor. However, in order to protect any electrical circuitry being shielded, it is preferable that it be generally waterproof and weather resistant. In the case where the shield is used to protect an encased telephone service line and/or an interconnection box, such characteristics will enable the shield to perform its function and avoid the need for periodic replacement due to cracking and the like.

As explained below, the shield 10 forms a passive, electrical shield as a result of its multi-layered construction. Each part of the shield is preferably formed from a sheet of copolymer of the styrene family, namely weatherable acrylonitrile butadiene styrene. However, as will be appreciated by an artisan, there are a wide array of plastics that will work for the intended purpose. In addition, the shield can even be formed out of thin, pliable sheets of wood. However, an acrylonitrile butadiene styrene material is presently preferred because it is inexpensive, non-conductive and exhibits excellent weather resistant properties.

Although any number of processes are applicable to forming the styrene sheets in the desired shape, the presently preferred process is thermoforming because the molds for achieving that process are quite inexpensive. Of course, the material can be formed into the desired shape by injection molding or other plastic forming processes. As shown in FIG. 1, the shield box 7 preferably is formed from two boxes 11 and 14. The outside box 14 should fit snuggly over the inside box 11. Each of the formed panels 11 and 14 are opened at their "bottom" and mounted e.g., on a wall such as the side of the building by means of the flanges 15, 15' which are positioned along the front or open side of the box and which are provided with the plurality of mounting notches (13, 13') so as to securely hold the shield when it is set on appropriate screws or the like and then slid into place.

As alluded to above, the thickness of the material which forms the boxes 11 and 14 can be quite thin. It need only be sufficiently thick to be self supporting as the entire structure operates on principal of tamper detection, not armored resistance to tampering. Although the preferred plastic material will stand up normal wear and tear, one of ordinary skill in the art would appreciate that it is quite fragile in terms of tearing resistance, which is a desired detection feature of the present invention. In fact, in the presently preferred embodiment, the inside panel 11 is only one-eighth inch thick at the flange and, due to the nature of thermoforming, only 0.0026 inches thick at the back surface 16'. In the presently preferred embodiment, the outside panel 14 is even thinner, having a flange thickness of only about one-sixteenth of an inch and a wall which tapers down to only 0.0017 inches at the back panel 16.

It is noted that in the illustrated embodiment of FIG. 1, the flange 13 only extends around three sides of the box 16. That is because in the illustrated design, the box 16 is intended to be positioned flush against a bottom surface, e.g. the ground through which a service wire or the like will extend. In other embodiments of the shield, the flange 13 may extend around the entire perimeter of the box 16. The outside box 14 is preferably glued into place over the inside 11 in a water tight fashion.

Figure 2:
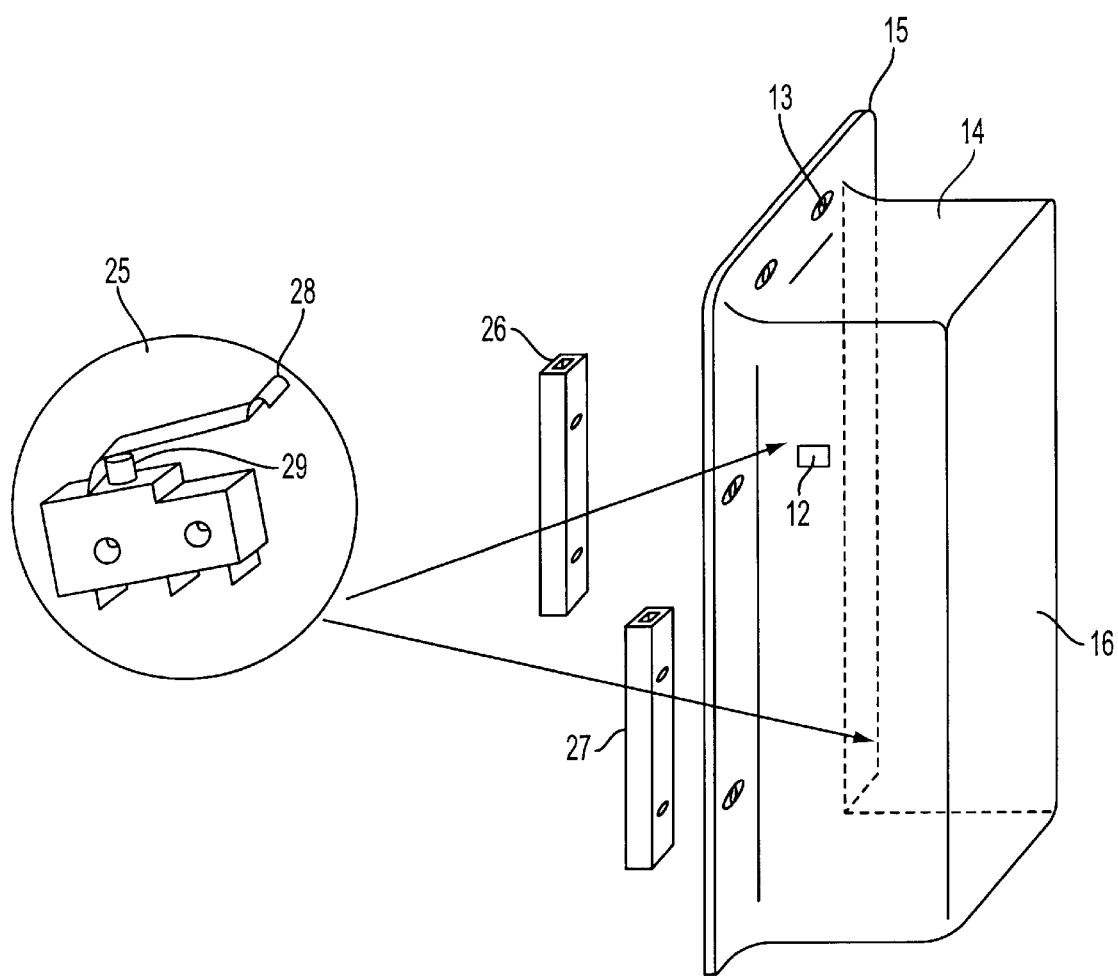
FIG. 2 is a perspective view, in partial phantom of a shield according to the present invention, illustrating the tamper resistant switch(es) and their location(s) on the shield.

Returning to the illustrated embodiment, the shield is opened at the bottom and mounted on the side of the building or the like by means of the flanges 15 turning to FIG. 2, in the presently preferred embodiment, tamper switches 25 are used to generate an alarm signal if an unauthorized attempt is made to remove the shield 10 from the building wall once it is set in place as illustrated. Preferably, two tamper switches 25 are provided and are mounted on the inside of the inner panel 11, i.e. against the side that faces the wall. The tamper switches 25 are preferably of the lever type having a spring lever 28 which, in the compressed or biased position, depresses a button switch 29. As best illustrated in FIG. 2, the tamper switches 25 are preferably mounted on opposite sides of the inside panel 11 and are vertically staggered with respect to the orientation of the panel. A pair of trigger bars 26 and 27 are mounted on the wall having the telephone service or interconnection box to be protected. The bars 26 and 27 are located such that any movement of the box 10 upward or outward will cause the spring arm 28 to pivot outwardly thereby causing release of the button 29 triggering an alarm.

Turning now to FIG. 3, the presently preferred laminate type conductive element which forms the electronic sensor of the present invention will now be described. It should be appreciated that although the described embodiment uses a particular commercially available shielding tape, there are any number of conductive plastics or inks that could be used to form the electronic sensor portion of the present invention.

Figure 3A:
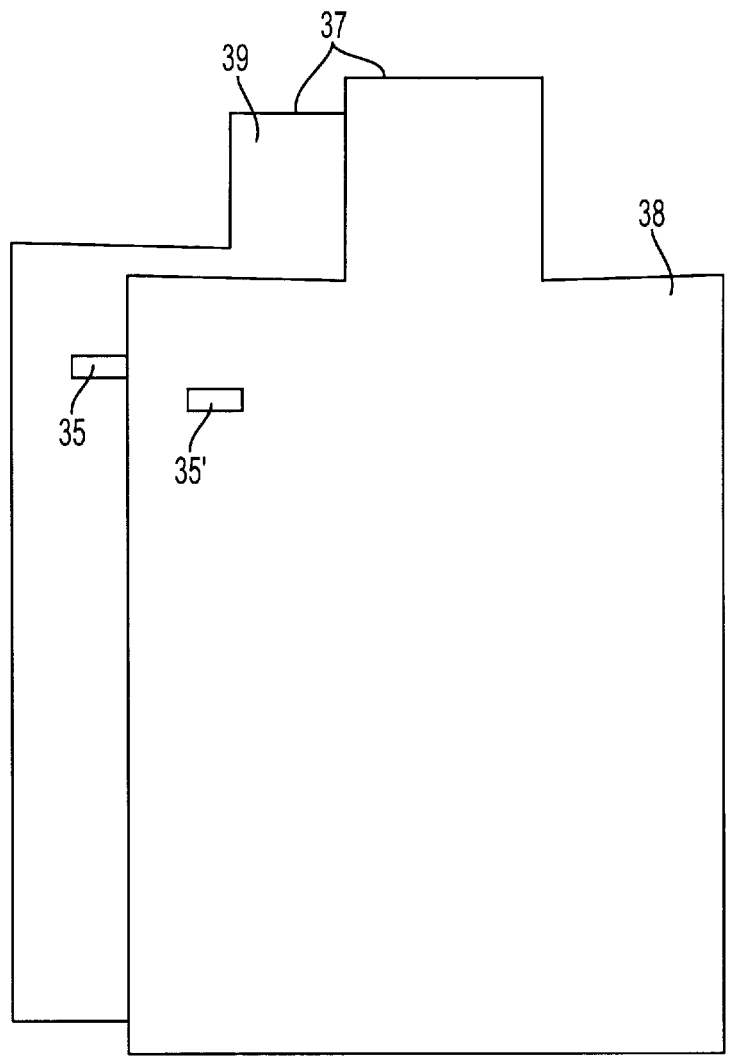
FIGS. 3A and 3B are plan and cross-section views respectively of the laminates used to form a shield according to an embodiment of the invention.
Figure 3B:
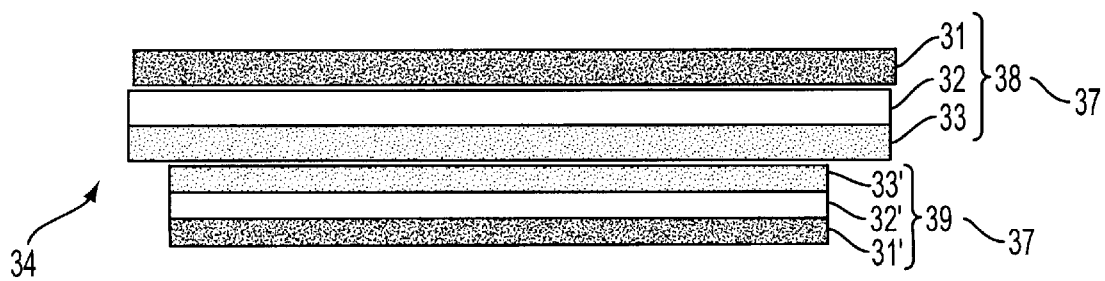

Each of the sheets 38 and 39 are preferably formed from NEPTAPE 1184 manufactured by NEPCO Inc of Pawtucket, R.I. NEPTAPE 1184 is a coated, fusible shielding tape typically used in one-inch strips. In FIG. 3B, there is depicted the laminate structure for the presently preferred embodiment of the layered NEPTAPE. Reference numeral 31 is a layer of aluminum foil, approximately 0.001 inches thick. Layer 32 is a polyester film which is approximately 0.00092 inches thick. A layer of PVC heat seal 33 on top of the polyester film 32 is approximately 0.0002 inches thick. The overall thickness of the laminate 38 is approximately 0.0022 inches. In order to form a thin electronic sensor laminate for the present invention, the foil laminate is cut into the general configurations 38 and 39 depicted in FIG. 3A. The layer 39 is essentially identical in shape as the layer 38 but is sized slightly smaller as when the panels are folded, the layer 39 fits within the layer 38. A rectangular notch 35 and 35' is cut out of each laminate 39 and 38 respectively and the two laminates, with the PVC coating layers 33 and 33' facing each other are aligned and laminated into one piece 37 which has an overall thickness of approximately 0.0044 inches. Preferably a standard laminating machine available from Seal, Inc. may used for this purpose. It should now be/P appreciated by the artisan, the result is a very thin electronic sensor laminate 37 comprising an aluminum layer 31, a polyester layer 32, a PVC layer 33 another PVC layer 33', a second polyester layer 32' and a second aluminum layer 31'.

Figure 5:
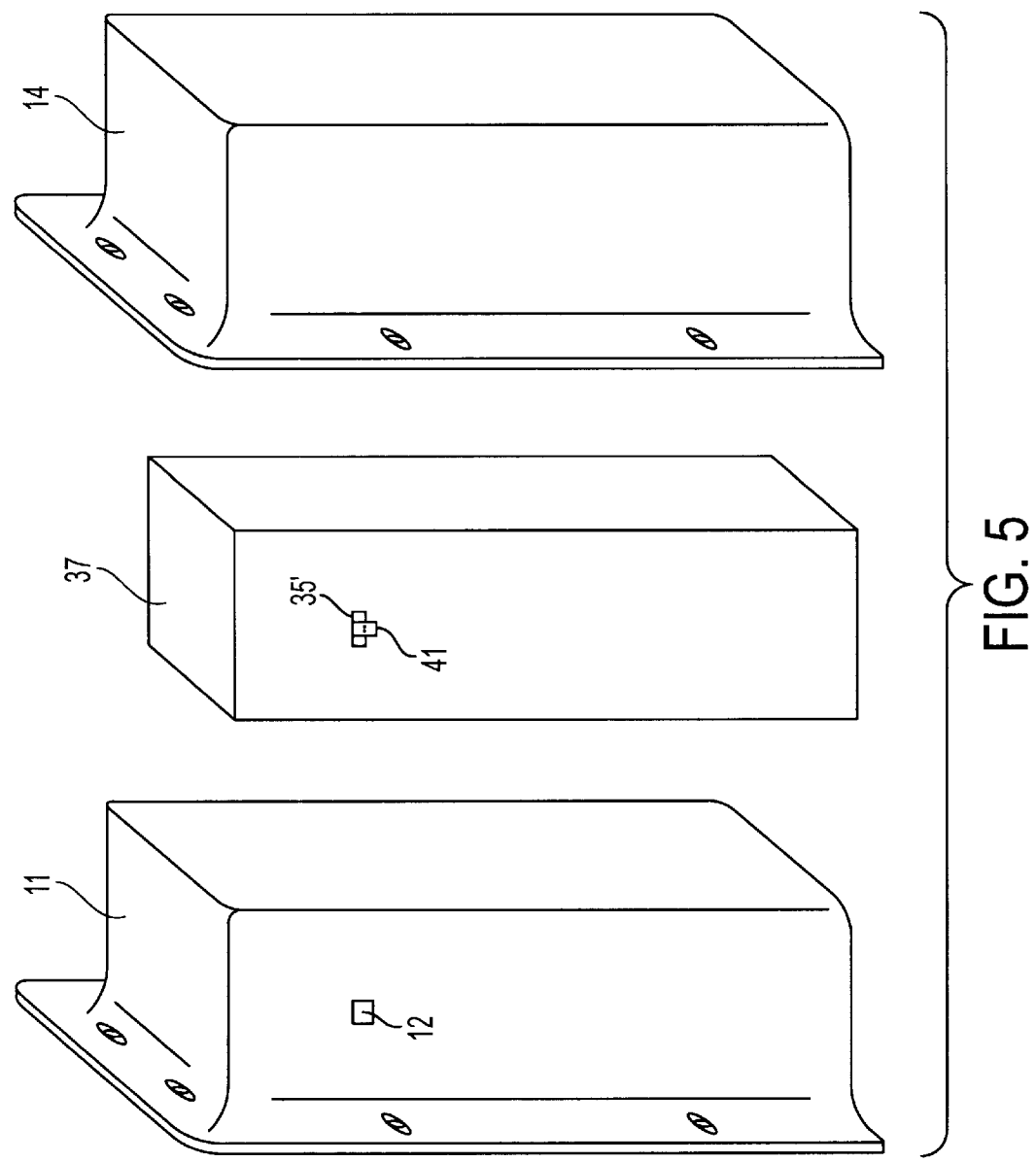
FIG. 5 is an exploded, perspective view of the major components of a shield according to the present invention as generally positioned prior to bonding.

It should be noted that the cut shape of the layers 38 and 39 are configured to fit between the inner box 11 and outer box 14 as best seen in FIG. 5. The cut out shape illustrated in FIG. 3A is exemplary only and it should be appreciated by the artisan that the electronic sensor laminate is intended to conform in size and geometry to the space between the inner and outer boxes 11 and 14. The important point to remember here is the general formation of a thin electronic sensor laminate structure 37 having two conductive layers 31 and 31 prime separated by non-conductive material.

Figure 4:
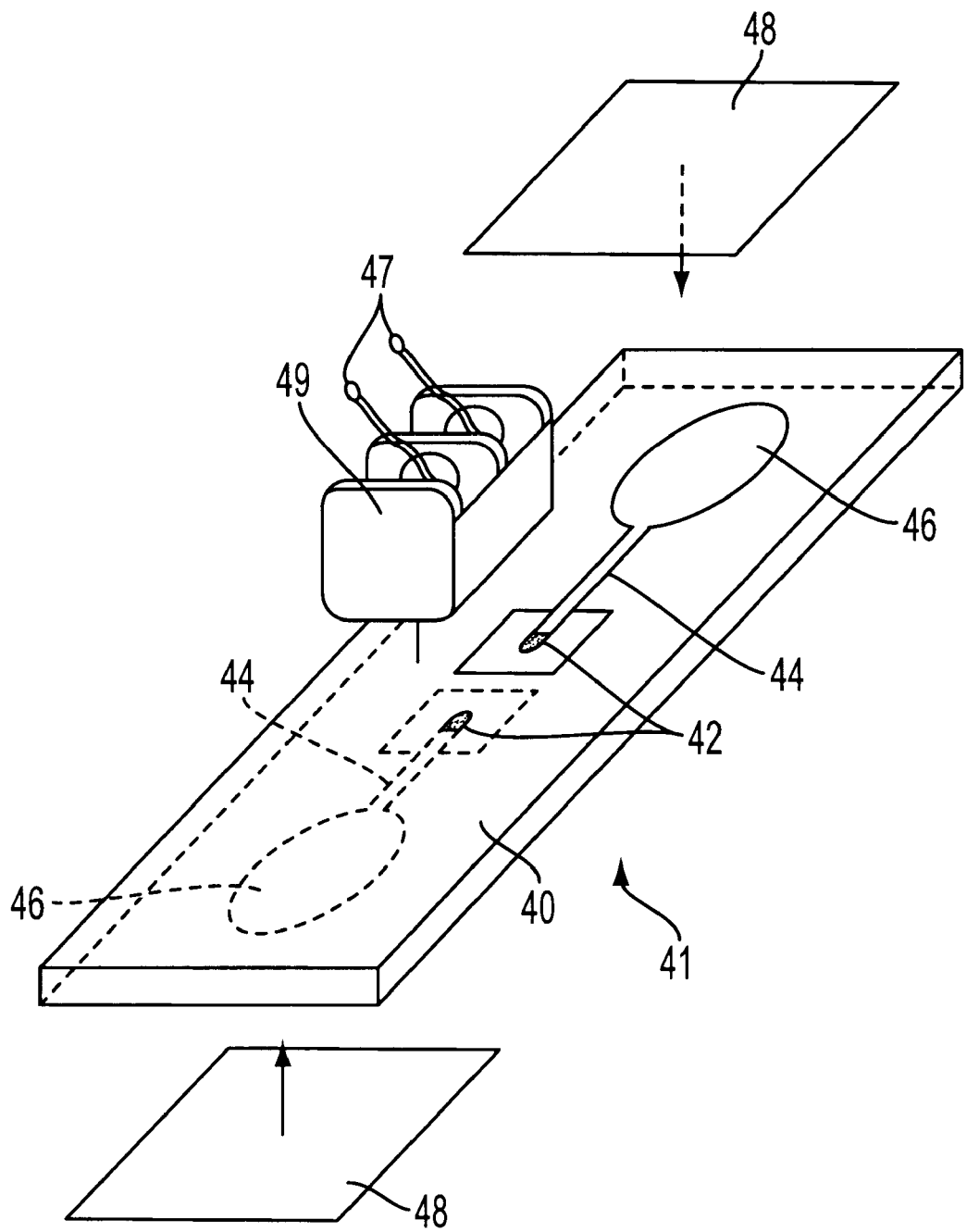
FIG. 4 is a perspective view of connection block showing a preferred connection to the laminate.

Turning now to FIG. 4, there is depicted an exemplary embodiment for making a reliable and essentially weather proof connection to such a thin laminate. The illustrated embodiment depicts an alarm connector assembly 41 formed from a double sided printed circuit board (PCB) 40 having a pair (in the illustrated embodiment) of plated through holes or vias 42. Each through hole 42 is connected via a trace line 44 to a solder pad 46. In the illustrated embodiment, it should be noted that each side of the PCB 40 has a mirror image through hole, trace line and solder pad. A standard two position terminal block 49 is conductively attached to plated through holes 42, preferably by soldering. Wires 47 are used to connect the shield to an alarm. A swatch of double sided conductive adhesive 48 is attached to each solder pad 46. Although many two-sided conducted adhesives are available, in the preferred embodiment, a two-sided conducted adhesive made by 3M is used. One end of the PCB 40 is inserted through the rectangular notch 35 and 35' cut in the conductive (preferably aluminum) laminate 37 such that each of the solder pads 46 is electrically bonded to one of the layers of the aluminum laminate 37 by the conductive adhesive swatches 48.

The conductive adhesive swatches 48 should be selected for their immunity to weathering and should offer good electrical connection to aluminum. This avoids the expensive problem of making an electrical solder joint on the conductive i.e. typically aluminum, layer.

Turning now to FIG. 5 the assembly of the device will be described. The laminate composite 37 having the alarm connector assembly 41 mounted therein is then mounted onto the inner panel 11 of the acrylonitrile butadiene styrene, which as described above, has a notch 12 cut into it in order to provide clearance for the two position variable terminal block 49 which will connect to the burglar alarm or the like. The outer panel 14 is then placed over the inner panel 11 and the panels are glued together. Preferably, a bead of acrylic glue is formed completely around the flanges 15 and 15' of the inner and outer panels in order to accomplish the above.

Figure 6:
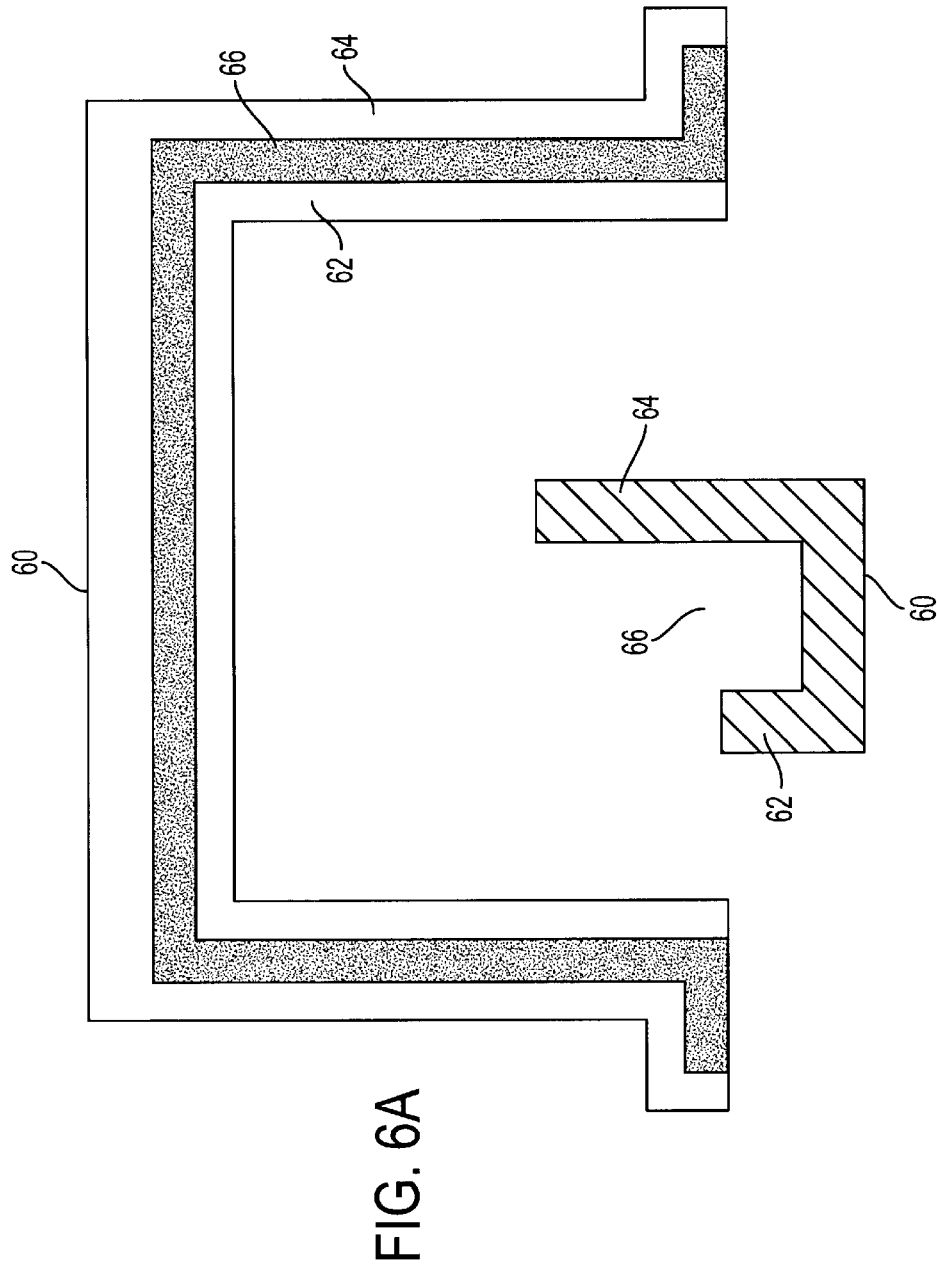
FIGS. 6A and 6B are top and sectional views respectively of a bracket which is advantageously used with a shield made according to the present invention.

Because the panels 11 and 14 are quite thin and pliable, especially at the bottom side where they are open, a simple bracket, illustrated in FIG. 6 may be used for added T rigidity. In the preferred embodiment, a bracket 60 made of cast aluminum is used. The bracket 60 is glued to the bottom of the shield structure using a similar acrylic adhesive as that used to bond the two styrene panels 11 and 14 together. The bracket 60 is designed such that the flanges 15 and 15' of the composite structure will preferably protrude slightly beyond the bracket 60 so that structure will fit flush against the building or wall to which it is attached. The bracket 60 has an outer wall 62, and inner wall 64, and between them a channel 66 into which the multi-layered shield structure fits and into which it is glued. As should be apparent to one of skill in the art, although cast aluminum in a specific configuration is disclosed as the framing member, any number of configurations and materials would work as well.

Figure 7:
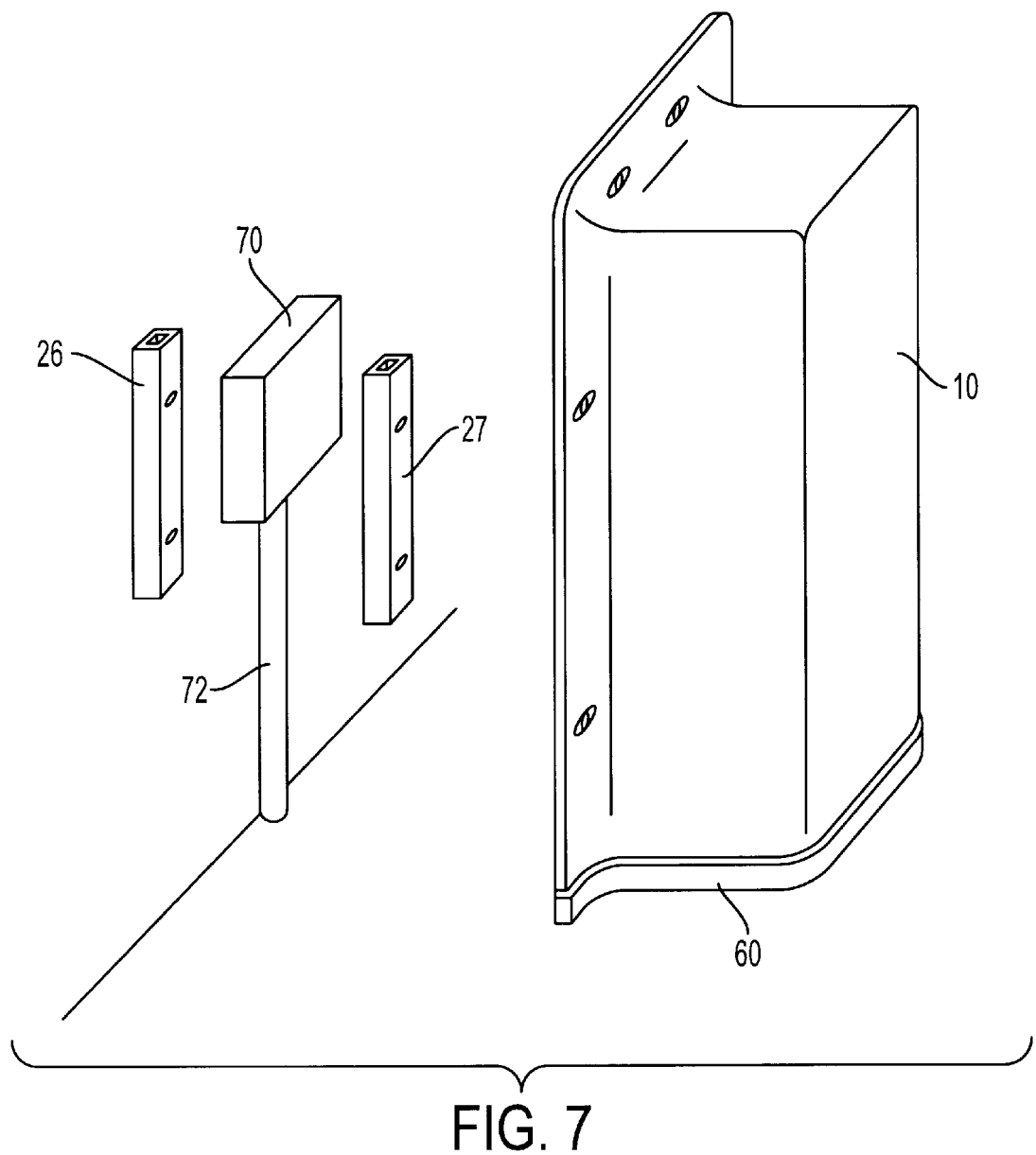
FIG. 7 is a perspective view illustrating a fully assembled shield positioned to encase an exemplary telephone line and service box and illustrating the approximate position of the tamper resistant switch trigger bar(s).

FIG. 7 depicts an assembled unit including the composite styrene panel box 10 having the bottom bracket 60 in a position ready to be mounted encasing a device to be protected such as a telephone interface device 70 supplied by an underground telephone service line 72. The trigger bars 26 and 27, which are detailed above in FIG. 2, are mounted on the wall and positioned so as to cooperate with the tamper switches 25.

As will be appreciated by the artisan, although the shield 10 is depicted in the form of a rectangular box, open at the bottom and having mounting flanges framing three sides of the front opening, other shapes and physical configurations will suggest themselves to the artisan for particular applications and are within the scope of the present invention. The configuration depicted is, however, an economical one to mold and manufacture.

The shield box 10 and bracket 60 preferably extend to, and more preferably beneath, the grade level in order to fully encase the service line(s) 72 provided by the telephone company.

As alluded to above, the two terminals of the terminal block 49 are connected to an alarm system, preferably the main alarm system for the building or residence. Configured in this way, any attempt to drill or otherwise cut through the shield box will short circuit the conductive layers, thereby triggering the alarm. Any unauthorized attempt to remove the shield, e., by prying it off the wall, will likewise trigger an alarm by means of the tamper switches 25. However, simply by deactivating the alarm, authorized access to the telephone service cable 72 and interconnection box 70 can be accomplished by removing the shield 10 from the wall in the conventional manner.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A passive electrical shield for securing a device enclosed therein, said shield comprising:
    a pair of generally complimentary shaped non-conductive, non-armored panels sized and configured to essentially fully enclose the enclosed device, said panels being in the form of an enclosure having an opening at a front side thereof;
    a conductive laminate supported between said panels, said laminate comprising at least two conductive layers separated by a non-conductive layer;
    a terminal for connecting said conductive layers to an alarm; and
    means for securing said electrical shield to a wall with said front opening opposing said wall whereby said device to be protected is essentially fully encased therein; and wherein said conductive layers are adapted to be short circuited together in the event of an intrusion attempt thereby completing an electrical circuit whereby said alarm will be triggered.

2. The passive, non-armored electrical shield according to claim 1, further comprising at least one tamper switch, responsive to displacement of the shield with respect to the wall, to trigger said alarm.

3. The passive, non-armored electrical shield according to claim 2, wherein said tamper switch has an associated trigger bar mounted on said wall for causing said tamper switch to generate an electrical signal when said shield is moved.

4. The passive, non-armored electrical shield according to claim 3 wherein said tamper switch includes a spring biased arm adapted to engage said trigger bar when shield is mounted on said wall.

5. The passive, non-armored electrical shield according to claim 3, further comprising a pair of tamper switches, responsive to movement of said shield, said trigger switches being disposed along opposite sides of said shield and vertically staggered with respect to the orientation of said shield when mounted.

6. The passive, non-armored electrical shield according to claim 1, further comprising a flange disposed along the front open side of said shield, said flange having means for mounting said shield on said wall.

7. The passive, non-armored electrical shield according to claim 6, wherein said wall comprises an exterior wall of a building on which said device to be protected is mounted, and wherein said shield has an access opening at a bottom end thereof through which a outside connection to said device to be protective may be made.

8. The passive, non-armored electrical shield according to claim 7, wherein said alarm is part of an alarm system of said building and said terminal and said tamper switch are connected to said alarm system.

9. The passive, non-armored electrical shield according to claim 1 wherein said a conductive laminate comprises a pair of conductive foil laminates, laminated together, each of said laminates comprising an conductive foil layer and a non-conductive layer.

10. The passive, non-armored electrical shield according to claim 9, wherein each of said conductive foils comprises a thin layer of aluminum , and said non-conductive layer comprises a polyester film and heat seal coating.

11. The passive, non-armored electrical shield according to claim 3, wherein said tamper switch further comprises a plunger switch responsive to a relative displacement between said electrical shield and said trigger bar to trigger said alarm.

12. The passive, non-armored electrical shield according to claim 10, wherein said terminal comprises a PCB having a terminal block supported thereon, said PCB having a pair of conductive pads each electrically connected to one of said aluminum foil layers and wherein said terminal block has a pair of terminals, each electrically connected to one of said pads and to said alarm whereby an electrical short circuit between said first and second aluminum foil layers will activate said alarm.

13. The passive, non-armored electrical shield according to claim 7, wherein the device to be protected comprises a telephone service box and associated underground telephone service line, wherein said access opening comprises an open bottom end in said panels, and further comprising a frame for supporting said access opening.

14. The passive, non-armored electrical shield according to claim 13 wherein said frame includes a channel member, sized to accept said panels and shaped to conform to said access opening.

15. The passive, non-armored electrical shield according to claim 12 wherein PCB is double sided and said pair of conductive pads are disposed on opposite sides of said PCB and wherein said pads are electrically connected to said aluminum foil layers by means of a conductive adhesive.

16. The passive, non-armored electrical shield according to claim 1 wherein said panels are formed into a box shape, open on a front and bottom side thereof and having a side flange member extending about three sides thereof.

17. The passive, non-armored electrical shield according to claim 16 wherein said panels are attached to each other by means of acrylic glue.

18. The passive, non-armored electrical shield according to claim 16 wherein said conductive laminate is shaped to be essentially complimentary to said pair of panels and to generally occupy the box shaped space between them.

* * * * *